July 22, 1969        J. R. GIER, JR        3,456,319

METHOD OF MAKING MULTIFIN HELICAL FIN TUBES

Filed Jan. 23, 1967        2 Sheets-Sheet 1

INVENTOR.

BY John R. Gier, Jr.

John H. Leonard his ATTORNEY.

July 22, 1969        J. R. GIER, JR        3,456,319
METHOD OF MAKING MULTIFIN HELICAL FIN TUBES
Filed Jan. 23, 1967        2 Sheets-Sheet 2
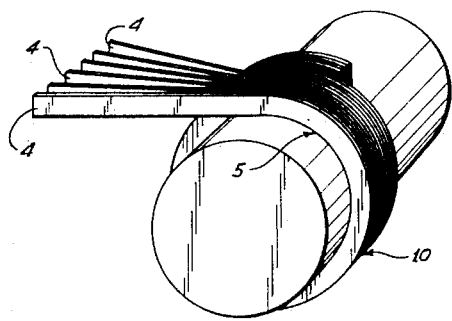
Fig. 6.
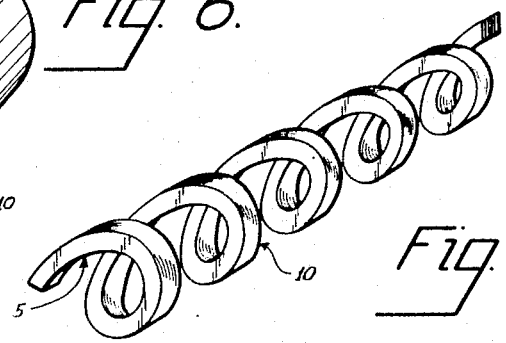
Fig. 7.
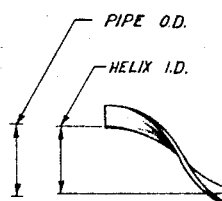
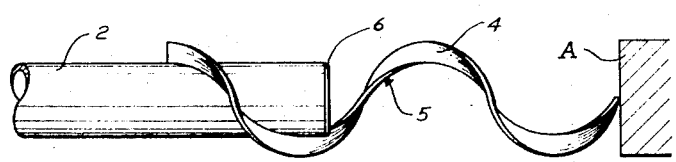
Fig. 8.
Fig. 9.
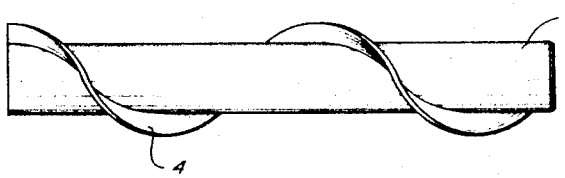
Fig. 10.
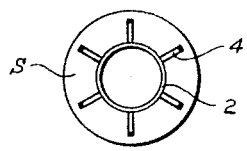
Fig. 12.
Fig. 11.
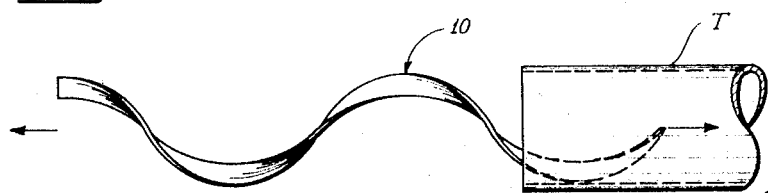
Fig. 13.
INVENTOR.
John R. Gier, Jr.,
BY John H. Leonard
his ATTORNEY.

United States Patent Office 3,456,319
Patented July 22, 1969

---

3,456,319
METHOD OF MAKING MULTIFIN HELICAL FIN TUBES
John R. Gier, Jr., Hines Hill Road, Hudson, Ohio 44236
Filed Jan. 23, 1967, Ser. No. 611,075
Int. Cl. B21d 53/00
U.S. Cl. 29—157.3       7 Claims

---

ABSTRACT OF THE DISCLOSURE

Method of making a multifin tube by winding helix fins, stressing said fins endwise, applying a force on the helix fins to elastically deform them axially and thereby change a diameter of the helix and allow a tube to be telescopically placed in relation of said helical fins, then relaxing said helical fins from said elastic deformation to frictionally engage said tube to said fins, and bonding said fins to said tube.

---

This invention relates to helical fin tubes and to a method of making the same.

More particularly, the invention relates to multifin fin tubes wherein a plurality of fins extend helically about a tube in coaxial relation therewith and in face to face spaced relation to each other with one edge of each fin engaging the tube surface and being permanently bonded thereto, and to a method of making such multifin fin tubes.

Though the invention is especially beneficial and its advantages most pronounced in connection with multifin fin tubes of which the helix angle is relatively steep, such as to permit the flow of air or fluid between adjacent fins predominantly axially of the tube, as distinguished from predominantly radially of the tube, the invention, however, does have some advantages in connection with multifin fin tubes of which the helix angle is small, so that the flow of fluid between adjacent fins is predominantly radially.

For purposes of illustration, the invention will be described in connection with multifin helical fin tubes having a large helix angle, that is, a large angle between the bands and a plane normal to the axis of the tube, the application of the method to other types of multifin fin tubes being readily apparent from the illustrative example.

One of the principal objects of the invention is to provide a method of manufacturing such multifin fin tubes whereby accurate control of the spacing and positioning of the fins can be obtained initially and retained during the subjection of the fin tube to brazing temperatures without the necessity of complicated extraneous holding equipment for maintaining the fins in the desired position on the tube during the brazing operation.

Another object is to provide a multifin tube of the character described of which the helical bands forming the fins are accurately and precisely positioned and are joined to the tube by bonding of an edge of each band directly to the exterior surface of the tube without special band receiving notches and formations on the tube surface, and of which the bands and tube wall exposed between the bands are free from excess brazing material and globules formed thereof, so that the surfaces which define the passages for the flow of fluids between the fins and over the surface of the tube are smooth and clean and free from any flow obstructing extraneous matter.

Various other objects and advantages will become apparent from the following description wherein reference is made to the drawings in which FIG. 1 is a front elevation of an external fin type of multifin fin tube embodying the principles of the present invention and formed by the method thereof;

FIGS. 6 through 10 are diagrammatic illustrations, respectively, illustrating steps of the method of making the externally finned multifin tubes of the present invention wherein:

FIG. 6 illustrates the manner of forming a multiband helix from which the fins are to be formed;

FIG. 7 illustrates the step of elongating the multiband helix;

FIG. 8 shows one of the helical bands and the relation of its inner diameter to the exterior diameter of the tube with which it is to be associated after the permanent elongation of the helix, a single band only being shown for clearness in illustration;

FIG. 9 illustrates by a single band the manner of initially placing the helical bands concurrently on the tube;

FIG. 10 shows, by a single band, the installation of the bands on the exterior of the tube preparatory to proper spacing of the bands from each other;

FIG. 11 illustrates the step of spacing the helical bands in proper face to face relation;

FIG. 12 is a left end elevation of the structure illustrated in FIG. 11, and

FIG. 13 illustrates the mounting of a multiband helix in the interior of a tube for providing an internal multifin fin tube.

Figure 1:
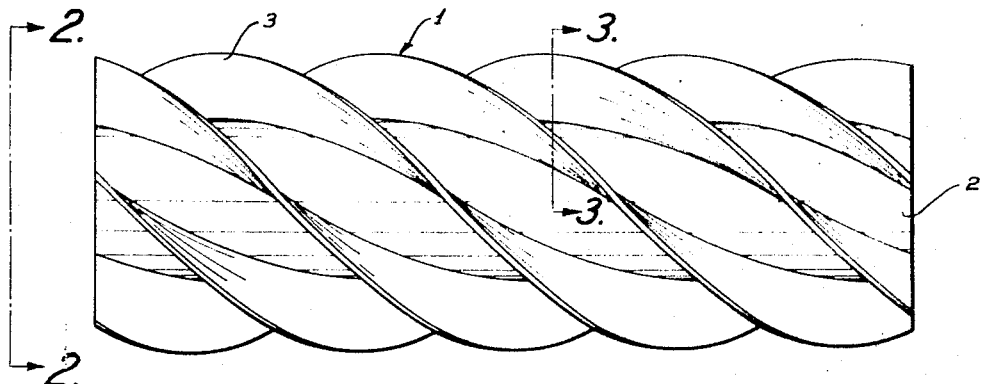

Referring first to FIG. 1, a multifin fin tube is illustrated and indicated generally at 1, and comprises a preformed tube 2 on the exterior of which are a plurality of helican fins 3. The fins 3, in the form illustrated, are in spaced face to face relation, the spacing being uniform throughout the length of the tube. The innermost edges of the fins are directly bonded to the external wall of the tube without special preconfiguration of the wall as by fin receiving notches, shoulders, and like holding and spacing means.

Characteristic of the tube are that the fins are parallel to each other and equidistant from each other in a direction endwise of the tube. The fins are preferably secured to the tube by brazing, with the brazed material selected and applied so that there is no excess over that required to form an edgewise bond with at most minute fillets between the faces of the fins and the surface of the tube at the joined edges, and so that the passages between the fins are free from any globules or particles of brazed material which could in any way interfere with the flow of fluids along the tube between the fins.

Figure 3:
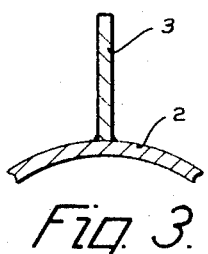
FIG. 3 is an enlarged fragmentary sectional view taken on the line 3—3 in FIG. 1 showing the juncture between one of the fins and the wall surface of the tube.
Figure 2:
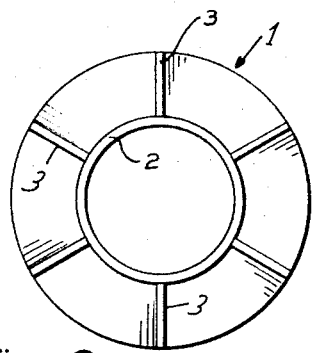
FIG. 2 is a right end elevation of the fin tube illustrated in FIG. 1.

The fin tube shown for illustration in FIGS. 1 through 3 is an external multifin fin tube having six fins and is formed in accordance with the method of the present invention, the application of the invention to single and multifin fin tubes being apparent from the illustrative example.

In forming the fin tube 1, six bands 4 of sheet metal or material, preferably of equal width and thickness, are wound edgewise concurrently onto a suitable mandril into a closely wound helix 5, preferably with the faces of the bands in contact or very close to each other and with an extremely small helix angle and an internal diameter sufficiently greater than the external diameter of the tube 2 so that, when the multiband helix is stretched as a unit endwise above its yield point to the desired helix angle and takes a permanent set, the internal diameter of the helix will be proper for performing succeeding steps of the method.

The bands 4 are wound concurrently about a mandril into such a helix 5, as illustrated in FIG. 6, which usually is of very much larger diameter than the tube to be used. The helix 5 is then stretched axially, preferably by gripping the group of bands at the opposite end of the group, with single grippers arranged one at each end, and concurrently stretching the multiband convolutions, and hence the entire helix, axially of the helix to a degree above the yield point of the metal to permanently elongate the helix and provide an inside diameter slightly less than the outside diameter of the tube on which the fins are to be installed.

For ease in illustration, in FIGS. 8 through 10, only a single band 4 is shown as being subjected to the steps of the method, but it is to be understood that all six bands are subjected to the steps concurrently.

While the helix is in this permanenaly stretched condition, the ends of the band at one end of the helix 5 are moved apart flatwise and spaced uniformly circumferentially of the tube. This causes the bands to move approximately to proper circumferential spacing throughout their entire lengths. One end of the helix is then placed against an abutment, such as indicated at A. The tube 2, having a slightly tapered or chamfered end 6 for guiding and assisting in starting it axially into the helix, is placed against the opposite end of the helix 5 in coaxial relation and forced toward the abutment A. Such force compresses the helix axially elastically. This compression results in temporary enlargement of the internal diameter of the helix 5 so that the tube passes readily thereinto to the opposite end adjacent the abutment A. All six bands 4 forming the helix are thus installed concurrently.

When the helix 5 is installed on a tube in this manner and the axial forces are released, the helix, including all bands, tend to elastically restore themselves to the diameter which existed after the permanent elongation and in approaching this condition firmly embrace the exterior wall of the tube and hold themselves frictionally in fixed position on the tube.

As illustrated in FIGS. 11 and 12, after the tube has been embraced and gripped, a spacing ring S, having suitable generally radial grooves which permit the sliding of the bands therethrough so as to space the bands facewise from each other accurately about the axis of the tube, is engaged with the ends of the bands 4 at said one end of the helix and then tube 2 with the resulting bands 4 still unbonded to the tube are passed or pulled therethrough. If desired, before pulling the tube through the ring S, the ends of the bands 4 at the point of installation of the spacer may be tack-welded to the tube. As the tube and bands are passed or pulled through the spacer ring S, the ring spaces the bands accurately in the proper face to face spaced relation to each other. Generally, uniform spacing throughout the entire length of the tube is selected.

Having thus installed and spaced the bands 4, the ring S is removed and, if desired, as in the case of possible shipment or rough handling before brazing, the trailing ends of the bands 4 may be tack-welded to the tube. However, even without tack-welding, the bands retain their spaced position on the tube, due to their frictional grip, during normal on site finishing operations.

Next, brazing material, such as wire, dust, or paste, in the precise amount required to make the proper bond and without excess, is applied and the assembled tube and bands are brazed in a reduced atmosphere so as to permanently bond the bands 4 to the tube to provide the fins 3. If desired, the brazing material may be applied to the tube before putting on the fins.

It is to be noted that heretofore generally with fin tubes using edgewise bonded fins, the helix angle was less than 5 to 10°, whereas in the present case, the helix angle may be substantially any angle desired; for example, up to 85°, depending upon the predominance of axial flow that is desired.

Figure 5:
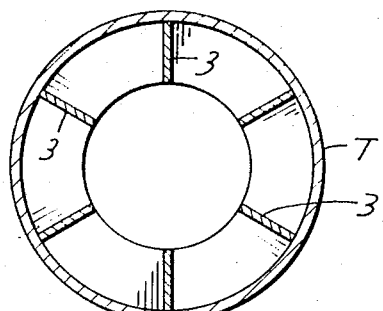
FIG. 5 is a cross sectional view taken on the line 5—5 of FIG. 4.
Figure 4:
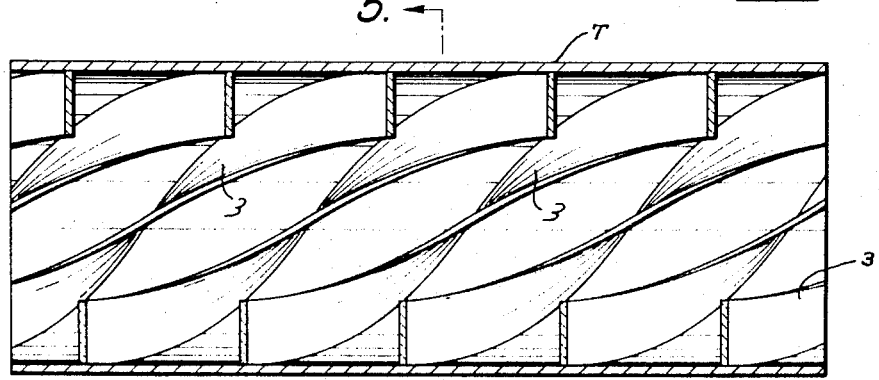
FIG. 4 is a longitudinal sectional view of a multifin fin tube formed in accordance with the present invention but with the fins arranged on the interior of the tube.

In many instances, as disclosed in FIGS. 4, 5 and 13, it is desirable to provide a multifin fin tube having internal fins. In such an instance, the same steps are performed as illustrated in FIGS. 5 and 6. However, in stretching and permanently deforming the helix, indicated at 10, the deformation is such as to make the external diameter of the helix 10 greater than the internal diameter of the tube T. Thus, whereas for the external fins, the helix 5 was compressed axially for insertion of the tube T, in the case of the internal fins, the helix 10 is subjected to axial tension to elastically deform it to a degree to reduce its external diameter to slightly less than the internal diameter of the tube T, so that the helix can be slid readily into the tube. When thus inserted and released, a suitable spacer spider is passed through the tube to space the fins the proper distance apart from each other.

Generally all that is necessary to provide proper spacing of the fins is to space their ends at each end of the tube properly before the tension is released, in which case the fins will adjust themselves to uniform spacing throughout the length of the tube. Thereupon the bands can be released. The internal fins likewise remain firmly in place due to frictional binding against the internal wall of the tube. In this condition, the required brazing paste or wire can be applied, or, if desired, the brazing material may be applied within the tube or on the bands prior to their installation in the tube. The brazing is effected in the same manner as in connection with the external fin tube above described.

Having thus described my invention, I claim:

1. The method of making multifin fin tubes with helican fins, and comprising:
   (a) concurrently winding edgewise a group of sheet metal bands arranged in flatwise facing relation to each other into a close wound multiband helix wherein one diameter of the helix is the same for all bands of the group;
   stressing the helix endwise, all bands concurrently and as a group, above the yield of the metal and thereby permaently deforming the helix to change the original dimension of said one diameter to a different dimension so that said one diameter is slightly different from the diameter of a tube to be associated therewith so that said edges of the bands and the surface of the tube to which the bands are to be connected edgewise resist being moved axially into relatively telescopic relation,
   separating the bands circumferentially of the helix axis to preselected spacing relative to each other,
   then applying force on the helix to elastically deform it axially and thereby further change said different dimension of said one diameter relative to said diameter of the tube to an extent that the tube and helix can be telescopically assembled by axial movement relatively toward each other with said helix at said one diameter sufficiently close to said surface so that, upon relieving said force, the bands elastically restores themselves to an extent that they resiliently engage said surface of the tube and frictionally bind thereagainst edgewise in fixed position relative to the tube, effecting said axial movement so as to relate the bands and tube telescopically, relieving said force; and
   then bonding the edges of the bands juxtaposed against said tube surface to said tube surface while the bands remain in fixed relation to the tube.

2. The method according to claim 1 wherein the fin tube is one wherein the fins are to be installed on the exterior of the tube:

said one diameter of the helix is the internal diameter of the helix;

said tube surface is the exterior surfaces of the tube; the helix is permanently deformed by elongating the helix axially until its internal diameter is slightly less than the external diameter of the tube; and the force applied for elastic deformation is an axially applied comprehensive force which increases the internal diameter of the helix so that the tube can be inserted axially into the helix.

3. The method according to claim 2 wherein the permanent deformation of the helix is effected by applying axially directed stretching force to the ends of the helix.

4. The method according to claim 2 wherein the compressive force is applied to the ends of the helix and directed axially thereof.

5. The method according to claim 1 wherein the fin tube is one wherein the fins are to be installed in the interior of the tube:

said one diameter is the external diameter of the helix;
said tube surface is the interior surface of the tube;
the helix is permanently deformed by elongating it axially, and thereby rendering its external diameter slightly greater than the internal diameter of the tube, and the force applied for elastic deformation is an axially applied stretching force which reduces the external diameter of the helix so that the helix can be inserted into the tube axially.

6. The method according to claim 5 wherein the permanent elongation is effected by applying axially directed stretching force to the ends of the helix.

7. The method according to claim 5 wherein the elastic deforming force is applied to the ends of the helix.

References Cited

UNITED STATES PATENTS

| | | | |
|---|---|---|---|
| 2,430,081 | 11/1947 | Roberts et al. | 29—446 |
| 2,440,698 | 5/1948 | Patterson | 29—157.3 XR |
| 2,752,953 | 7/1956 | Schmidt | 29—450 |
| 2,945,296 | 7/1960 | Jones et al. | 29—157.3 XR |
| 2,956,335 | 10/1960 | Matheny et al. | 29—157.3 |
| 3,112,558 | 12/1963 | Nihlen et al. | 29—456 XR |

CHARLIE T. MOON, Primary Examiner

R. B. LAZARUS, Assistant Examiner

U.S. Cl. X.R.

29—450, 456